United States Patent
Howard et al.

(10) Patent No.: US 8,868,450 B2
(45) Date of Patent: Oct. 21, 2014

(54) LIMITED-USE BROWSER AND SECURITY SYSTEM

(75) Inventors: Christopher J. Howard, Stratham, NH (US); Peter S. Levy, Los Gatos, CA (US); Joshue D. de la Cuesta, San Jose, CA (US)

(73) Assignee: Kualo Properties AU, LLC, Dover, DE (US)

( * ) Notice: Subject to any disclaimer, the term of this patent is extended or adjusted under 35 U.S.C. 154(b) by 387 days.

(21) Appl. No.: 13/212,787

(22) Filed: Aug. 18, 2011

(65) Prior Publication Data
US 2012/0042387 A1 Feb. 16, 2012

Related U.S. Application Data

(60) Continuation of application No. 11/742,855, filed on May 1, 2007, now Pat. No. 8,024,227, which is a continuation of application No. 09/745,395, filed on Dec. 21, 2000, now Pat. No. 7,225,157, which is a division of application No. 09/393,405, filed on Sep. 10, 1999, now Pat. No. 7,130,831.

(60) Provisional application No. 60/119,309, filed on Feb. 8, 1999.

(51) Int. Cl.
| | |
|---|---|
| *G06Q 30/06* | (2012.01) |
| *G06Q 30/08* | (2012.01) |
| *G06F 21/62* | (2013.01) |
| *G06F 21/10* | (2013.01) |

(52) U.S. Cl.
CPC ............ *G06F 21/10* (2013.01); *G06F 21/6209* (2013.01); *G06F 2221/0735* (2013.01); *G06F 2221/2149* (2013.01); *G06F 2211/007* (2013.01); *G06Q 30/0641* (2013.01); *G06Q 30/0601* (2013.01)
USPC .................................... 705/26.1; 705/27.1

(58) Field of Classification Search
CPC ............................... G06Q 30/06; G06Q 30/08
USPC .............................................. 705/26.1, 27.1
See application file for complete search history.

(56) References Cited

U.S. PATENT DOCUMENTS

| | | |
|---|---|---|
| 5,319,705 A | 6/1994 | Halter et al. |
| 5,495,411 A | 2/1996 | Ananda |

(Continued)

FOREIGN PATENT DOCUMENTS

| | | |
|---|---|---|
| EP | 1001330 A2 | 5/2000 |
| JP | 410187408 A | 7/1998 |

(Continued)

OTHER PUBLICATIONS

Benson, Jim, "Searching for stock photos online", Macworld. San Francisco: Au.q 1994. vol. 11, Iss. 8; p. 124, downloaded from ProQuestDirect on the Internet on May 18, 2011, 7 pages, first cited on May 27, 2011 in parent U.S. Appl. No. 11/42855, now US 8024227).*

(Continued)

*Primary Examiner* — James Zurita
(74) *Attorney, Agent, or Firm* — Amin, Turocy & Watson, LLP

(57) ABSTRACT

A limited-use browser and related security system control access to content stored on a server computer linked to a network. The security system secures the content on the server and only permits it to be downloaded to a client computer running the limited-use browser or a general purpose browser executing an add-in security module providing the same functions as the limited-user browser. The limited-use browser or module secures the downloaded content on the client computer and displays it in a "view-only" mode. While the secured content is being displayed, menu selections, key combination, or pointing device commands initiated on the client computer that would modify the content or create a copy of another medium are either disabled as a default or monitored to determine if the action is permitted.

29 Claims, 11 Drawing Sheets

(56) References Cited

U.S. PATENT DOCUMENTS

| | | | |
|---|---|---|---|
| 5,509,074 | A | 4/1996 | Choudhury et al. |
| 5,592,549 | A | 1/1997 | Nagel et al. |
| 5,629,980 | A | 5/1997 | Stefik et al. |
| 5,657,390 | A | 8/1997 | Elgamal et al. |
| 5,699,427 | A | 12/1997 | Chow et al. |
| 5,727,156 | A | 3/1998 | Herr-Hoyman et al. |
| 5,765,152 | A | 6/1998 | Erickson |
| 5,781,633 | A | 7/1998 | Tribble et al. |
| 5,799,081 | A | 8/1998 | Kim et al. |
| 5,809,145 | A | 9/1998 | Slik et al. |
| 5,825,890 | A | 10/1998 | Elgamal et al. |
| 5,852,666 | A | 12/1998 | Miller et al. |
| 5,872,915 | A | 2/1999 | Dykes et al. |
| 5,892,900 | A | 4/1999 | Ginter et al. |
| 5,926,631 | A | 7/1999 | McGarvey |
| 5,928,363 | A | 7/1999 | Ruvolo |
| 6,081,900 | A | 6/2000 | Subramaniam et al. |
| 6,105,012 | A | 8/2000 | Chang et al. |
| 6,105,131 | A | 8/2000 | Carroll |
| 6,366,912 | B1 | 4/2002 | Wallent et al. |
| 6,460,060 | B1 * | 10/2002 | Maddalozzo et al. ........ 715/234 |
| 6,490,626 | B1 | 12/2002 | Edwards et al. |
| 6,516,416 | B2 * | 2/2003 | Gregg et al. ...................... 726/8 |
| 6,594,692 | B1 * | 7/2003 | Reisman ...................... 709/219 |
| 6,658,571 | B1 | 12/2003 | O'Brien et al. |
| 6,907,476 | B2 * | 6/2005 | Wagner ........................... 710/11 |
| 7,047,241 | B1 * | 5/2006 | Erickson ............................... 1/1 |
| 7,079,649 | B1 * | 7/2006 | Bramhill et al. ............. 713/156 |
| 2009/0307078 | A1 * | 12/2009 | Mithal et al. ............... 705/14.35 |

FOREIGN PATENT DOCUMENTS

| | | | |
|---|---|---|---|
| JP | 2004303107 | A | 10/2004 |
| WO | 9624092 | A2 | 8/1996 |
| WO | 9825373 | A2 | 6/1998 |
| WO | 9844402 | A1 | 10/1998 |
| WO | 9966666 | A2 | 12/1999 |

OTHER PUBLICATIONS

International Search Report mailed Aug. 17, 2000 for PCT Application No. PCT/US00/02908, 1 page.
Office Action dated Dec. 11, 2009 for U.S. Appl. No. 11/742,855, 29 pages.
Office Action dated Jun. 11, 2010 for U.S. Appl. No. 11/742,855, 36 pages.
Notice of Allowance dated May 27, 2011 for U.S. Appl. No. 11/742,855, 49 pages.
Jim Benson. "Searching for stock photos online", Macworld. San Francisco: Aug. 1994, vol. 11, Iss. 8; p. 124, downloaded from ProQuestDirect on the Internet on May 18, 2011, 7 pages.
Office Action dated Dec. 19, 2000 for U.S. Appl. No. 09/393,405, 8 pages.
Office Action dated Apr. 4, 2001 for U.S. Appl. No. 09/393,405, 6 pages.
Office Action dated Jun. 19, 2001 for U.S. Appl. No. 09/393,405, 9 pages.
Office Action dated Aug. 21, 2002 for U.S. Appl. No. 09/393,405, 8 pages.
Office Action dated Feb. 24, 2003 for U.S. Appl. No. 09/393,405, 8 pages.
Office Action dated Aug. 8, 2003 for U.S. Appl. No. 09/393,405, 6 pages.
Office Action dated Mar. 24, 2004 for U.S. Appl. No. 09/393,405, 8 pages.
Office Action dated Nov. 1, 2004 for U.S. Appl. No. 09/393,405, 7 pages.
Office Action dated May 2, 2006 for U.S. Appl. No. 09/393,405, 4 pages.
Office Action dated Feb. 11, 2005 for U.S. Appl. No. 09/745,395, 9 pages.
Office Action dated Apr. 30, 2003 for U.S. Appl. No. 09/745,395, 7 pages.
Office Action dated May 25, 2004 for U.S. Appl. No. 09/745,395, 9 pages.
Office Action dated Aug. 16, 2005 for U.S. Appl. No. 09/745,395, 7 pages.
Office Action dated Sep. 6, 2006 for U.S. Appl. No. 09/745,395, 5 pages.
Office Action dated Sep. 13, 2004 for U.S. Appl. No. 09/745,395, 9 pages.
Office Action dated Oct. 30, 2002 for U.S. Appl. No. 09/745,395, 6 pages.
Office Action dated Nov. 13, 2003 for U.S. Appl. No. 09/745,395, 6 pages.
Office Action dated Dec. 13, 2005 for U.S. Appl. No. 09/745,395, 7 pages.

* cited by examiner

LIMITED-USE BROWSER AND SECURITY SYSTEM

CROSS-REFERENCE TO RELATED APPLICATIONS

This application is a continuation of U.S. patent application Ser. No. 11/742,855 filed on May 1, 2007, entitled, "LIMITED-USE BROWSER AND SECURITY SYSTEM", which is a continuation of U.S. Pat. No. 7,225,157 filed on Dec. 21, 2000, which is a divisional of U.S. Pat. No. 7,130,831 filed on Sep. 10, 1999, which claims priority to U.S. Provisional Application Ser. No. 60/119,309 filed on Feb. 8, 1999. The entireties of these applications are incorporated herein by reference.

BACKGROUND

This invention relates generally to Internet browsers and servers, and more particularly, to a method and apparatus for a limited-use browser and/or add-in security component and security system. Businesses and individuals currently use public networks such as the Internet and World Wide Web to distribute large amounts of information or "content" to many users allover the globe. Once this content is distributed over the web, the publisher and/or owner has virtually no control of its redistribution or use. The issue of controlling web content is very important to businesses because most web sites contain at least some content that is considered proprietary. The current lack of control of web content publishing involves a high degree of risk for intellectual property, and may prevent publication altogether. Web users typically compromise the security of web content using any of the methods given below.

1. Copy-and-paste method. The user selects an image or text and chooses "Copy" from the Edit menu (or alternately presses Control-C or any other keys that perform a copy function), and pastes the image or text into an application which allows saving.

2. Print method. The user prints text or images which can then be photocopied or re-digitized via scanning technology.

3. Print-Screen method. The user copies the screen into the common memory or "clipboard" used for inter-application communication and saves it as an image file. If the user simply intends to obtain text, the user then runs the captured image through an optical character recognition (OCR) application to output converted text.

4. Source method. The user views and/or saves the hypertext markup language (HTML) source code of the web page, then recreates and saves the original content.

5. Content Transferring. The user copies the file to disk or another machine or network node.

6. Save Method. The user simply chooses the save function and saves the content to the local machine.

Known solutions to the problem of maintaining control of web content generally fall into two categories. The first category relates to systems for marking and tracking image files. Such systems typically implement a "digital watermark". A digital watermark is typically a small piece of source code that is embedded into an image that enables the owner of the image to track its distribution over the web using specialized software. This tracking solution still provides very little control over how the content is actually distributed and is directed more toward providing some legal recourse once the content is already stolen.

The second category relates to large proprietary secure information distribution systems, which typically do not currently use common web browsers or the web in general. These proprietary systems use specific applications for allowing different levels of user control of certain documents. These specialized systems are usually found inside large corporations, and they tend to be very costly and are generally not accessed by users of the web. Neither solution provides control of web content. Large organizations can use internal intranets, local area networks (LANs) or wide area networks (WANs) for distribution of information that pose the same problems as those described above for public networks such as the Internet.

Therefore, there is a need for an easy and efficient way to provide controlled access to content and to control the distribution of content over a network in a manner that prevents unauthorized duplication.

SUMMARY

The above-mentioned shortcomings, disadvantages and problems are addressed by the present invention, which will be understood by reading and studying the following specification.

A limited-use browser and related security system control access to content stored on a server computer linked to a network. The security system secures the content on the server and only permits it to be downloaded to a client computer running the limited-use browser or a general-purpose browser executing an add-in security module providing the same functions as the limited-use browser. The limited-use browser or module secures the downloaded content on the client computer and displays it in a "view-only" mode. In one embodiment all forms of non-ephemeral reproduction (e.g. printing, saving to disk, etc.) are disabled. While the secured content is being displayed, menu selections, key combination, or pointing device commands initiated on the client computer that would modify the content or create a copy on another medium are either disabled by default or monitored to determine if the action is permitted. The protected content can be displayed in a window within the browser frame or in a separate window having a special control set. Any format that can be displayed via the Internet can be secured in the view-only mode. Other functionality includes the ability to secure, in view-only mode, non-web enabled files.

A limited-use web browser and related security system allows providers of text and images or other content to publish content on a local-area network (LAN) or wide-area network (WAN), such as the World Wide Web (web) and the Internet, while safeguarding their intellectual property against theft, distribution or resale by unauthorized organizations or individuals by controlling use of the content. The limited-use web browser/add-in security module of the present invention reads and displays any viewable web content including text, images, and streaming audio and video just as with a normal web browser but limits the user to an ephemeral-only view of the information, such as displaying text, images, or video on a computer monitor, or providing other ephemeral output such as audio through a sound card and speakers attached to the computer.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The disclosed technology is illustrated by way of example and may be better understood by referring to the following description in conjunction with the accompanying drawings, in which like references indicate similar elements and in which.

DETAILED DESCRIPTION

Figure 1:
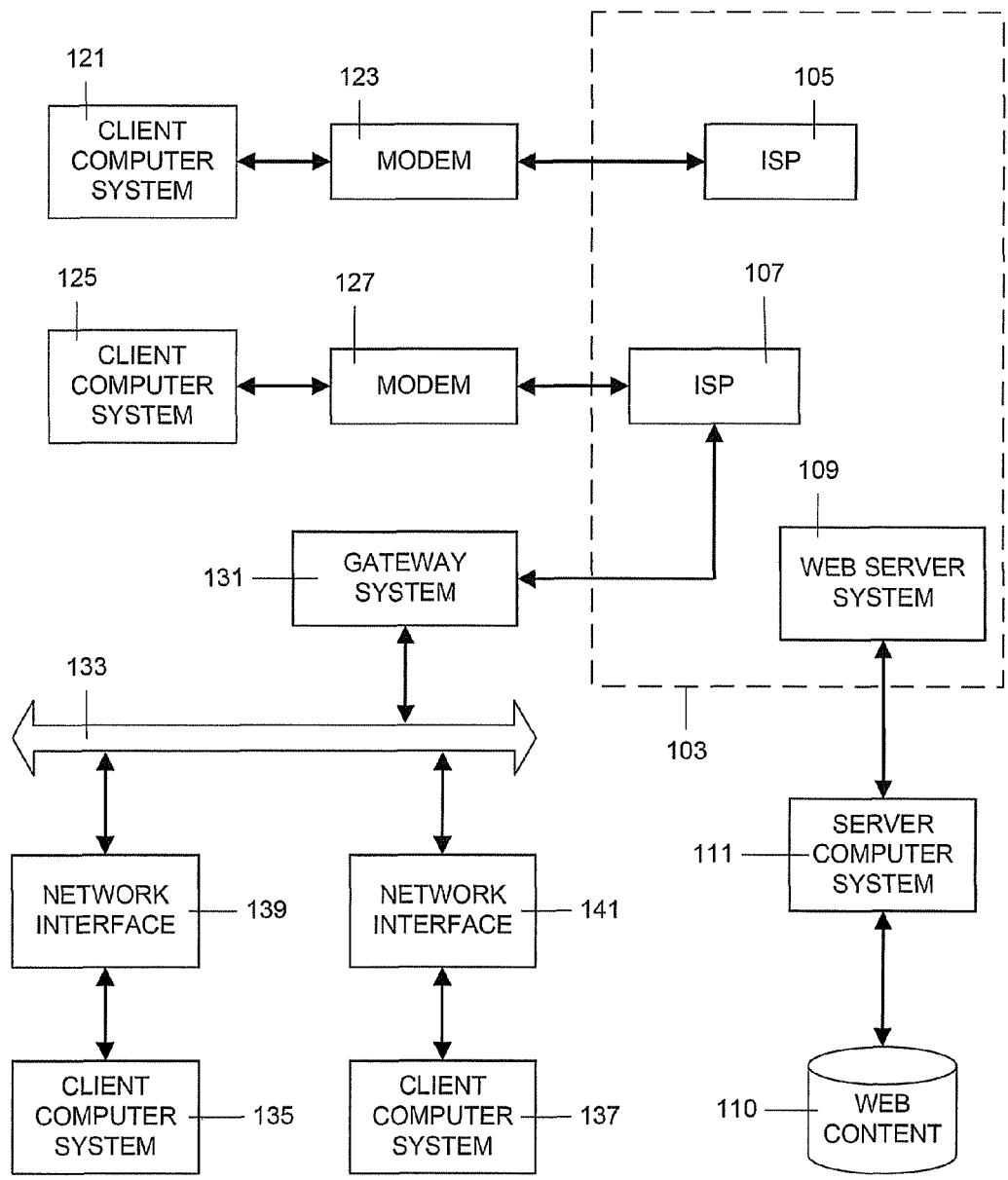
FIG. 1 is a diagram of one embodiment of an operating environment suitable for practicing the present invention.

While the invention has been shown and described with reference to a number of embodiments thereof, it will be recognized by those skilled in the art that various changes in form and detail may be made herein without departing from the spirit and scope of the invention as defined by the appended claims.

In the following description of an embodiment, reference is made to the accompanying drawings that form a part hereof, and in which is shown by way of illustration a specific embodiment in which the present invention can be practiced. It is to be understood that other embodiments can be utilized and structural changes can be made without departing from the scope of the invention. An embodiment of the disclosed technology, described below, enables a remote computer system user to execute a software application on a network file server.

A limited-use web browser and related security system allows providers of text and images or other content to publish content on a local-area network (LAN) or wide-area network (WAN), such as the World Wide Web (web) and the Internet, while safeguarding their intellectual property against theft, distribution or resale by unauthorized organizations or individuals by controlling use of the content. The invention can be implemented as a stand-alone web browser, or as an add-in security module, such as a plug-in or control, to be embedded into any existing web browser, including general purpose browsers such as Microsoft's Internet Explorer® and Netscape's Navigator®, or proprietary browsers such as that provided by America Online for its subscribers. The protected content can be displayed in a window within the browser frame or in a separate window having a special control set.

A web (or Internet) browser is a typically a software program having a graphical user interface (GUI) that provides information, including text, images, video, or audio, received from a remote source, such as a LAN or WAN server. In combination with a windowing operating system such as Windows 95. Windows 98, Windows NT, Macintosh System 8.0, or X-Windows running under UNIX, a standard web browser provides general data functions including file saving, file copying, printing, copying and pasting data to and from a shared application memory (commonly referred to as a "clipboard"), and screen capturing or printing. The limited-use web browser/add-in security module of the present invention reads and displays any viewable web content including text, images, and streaming audio and video just as with a normal web browser but limits the user to an ephemeral-only view of the information, such as displaying text, images, or video on a computer monitor, or providing other ephemeral output such as audio through a sound card and speakers attached to the computer. Ephemeral output, including view-only output, is visual or audio output that cannot be electronically reproduced or otherwise communicated by a computer system.

Any format that can be displayed via the Internet, such as web graphics, common gateway interface (CGI) scripts, JAVA scripts, can be secured in a "view-only" mode, including hyper-text markup language (HTML) files, Adobe Acrobat PDF files, ActiveX controls, and Microsoft Rich Text Format (RTF) components. Other functionality includes the ability to secure, in view-only mode, non-web based files, such as Microsoft Office Excel, Word, and PowerPoint files. The term "document" is used to refer in general all such content, in addition to its common usage with regard to a text file, and one of skill in the art will readily discern the proper meaning based on the context in which the term is used. Furthermore, the terms "provider," "content provider," "publisher" and "author" are used to refer to the owner of such content (or to an entity which is authorized to control such content), while the term "vendor" is used to refer to the developer of the limited-use browser and security system of the present invention.

The present description is divided into five sections. The first section describes one embodiment of an operating environment in conjunction with which embodiments of the invention may be practiced and presents various business models enabled by the invention. The second section provides a system overview of one embodiment of the invention. The third section describes methods performed by the embodiments of the invention in the overview section. The fourth section discloses a particular implementation of the invention. The fifth section presents a conclusion for the detailed description.

Operating Environment

The following description of FIG. 1 is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 1 shows several computer systems 101 that are coupled together through a network 103, such as a local-area network or the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 103 is typically provided by Internet service providers (ISP), such as the ISPs 105 and 107. Users on client systems, such as client computer systems 121, 125, 135, and 137 obtain access to the Internet through the Internet service providers, such as ISPs 105 and 107. Access to the Internet allows users of the client computer systems to exchange information, receive and send e-mails, and view documents, such as documents which have been prepared in the HTML format. These documents are often provided by web servers, such as web server 109 which is considered to be "on" the Internet. Often these web servers are provided by the ISPs, such as ISP 105, although a computer system can be set up and connected to the Internet without that system being also an ISP as is well known in the art.

The web server 109 is typically at least one computer system which operates as a server computer system and is configured to operate with the protocols of the World Wide Web and is coupled to the Internet. Optionally, the web server 109 can be part of an ISP which provides access to the Internet for client systems. The web server 109 is shown coupled to the server computer system 111 which itself is coupled to web content 110, which can be considered a form of a media database. It will be appreciated that while two computer systems 109 and 111 are shown in FIG. 2, the web server system 109 and the server computer system 111 can be one computer system having different software components providing the web server functionality and the server functionality provided by the server computer system 111 which will be described further below.

Client computer systems 121, 125, 135, and 137 can each, with the appropriate web browsing software, view HTML pages provided by the web server 109. The ISP 105 provides Internet connectivity to the client computer system 121 through the modem interface 123 which can be considered part of the client computer system 121. The client computer system can be a personal computer system, a network computer, a Web TV system, a mobile phone (e.g. a cellular telephone) having a processing system, or other such computer system. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of a LAN. While FIG. 2 shows the interfaces 123 and 127 as generically as "modem" 203, it will be appreciated that each of these interfaces can be an analog modem, ISDN modem, cable modem, satellite transmission interface (e.g. "Direct PC"), or other interfaces for coupling a computer system to other computer systems. Client computer systems 135 and 137 are coupled to a LAN bus 133 through network interfaces 139 and 141, which can be Ethernet network or other network interfaces. The LAN bus 133 is also coupled to a gateway computer system 131 which can provide firewall and other Internet related services for the local area network. This gateway computer system 131 is coupled to the ISP 107 to provide Internet connectivity to the client computer systems 135 and 137. The gateway computer system 131 can be a conventional server computer system. Also, the web server system 109 can be a conventional server computer system.

Figure 2:
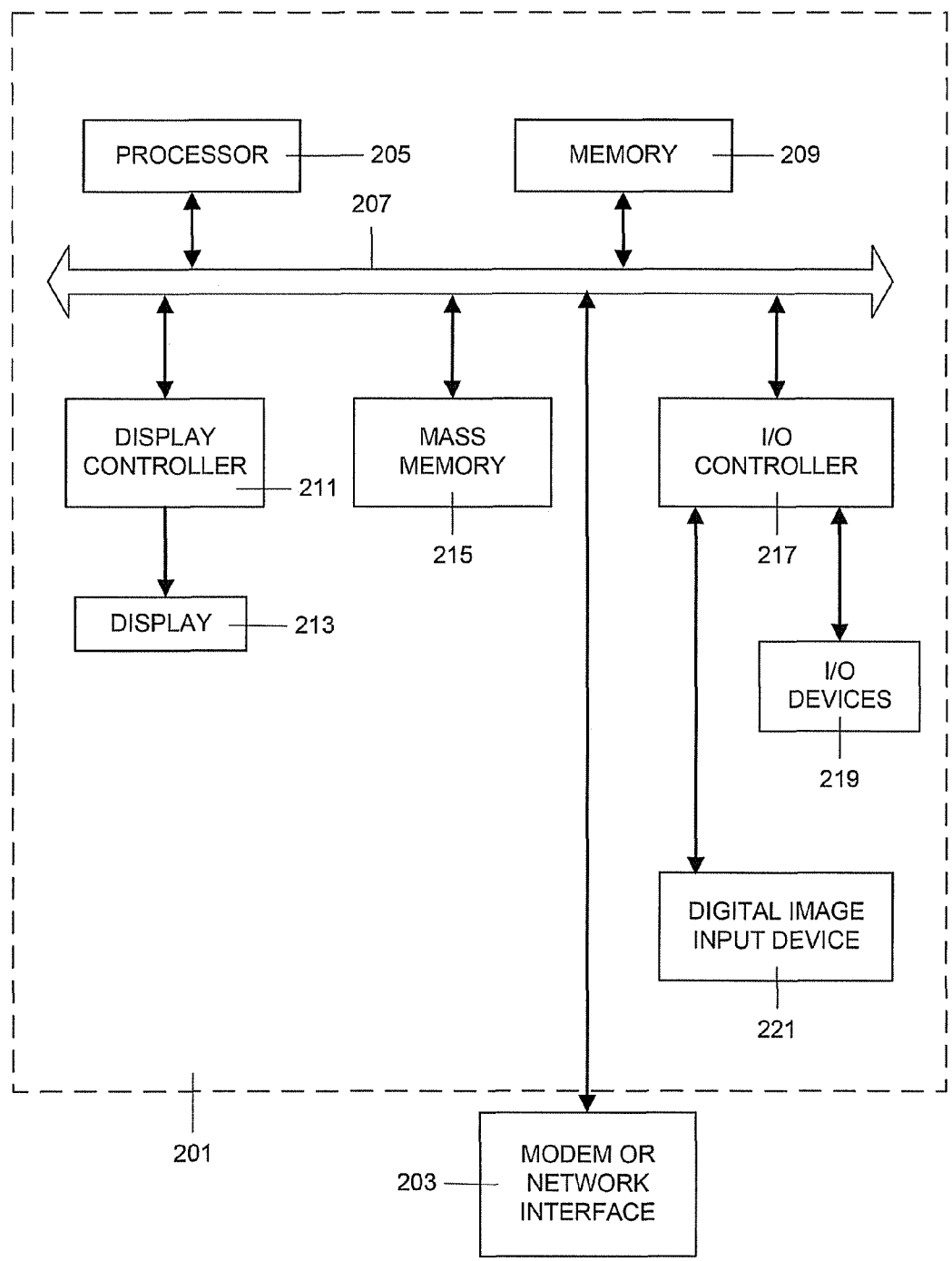
FIG. 2 is a diagram of one embodiment of a computer system suitable for use in the operating environment of FIG. 1.

FIG. 2 shows one example of a conventional computer system that can be used as a client computer system or a server computer system or as a web server system. It will also be appreciated that such a computer system can be used to perform many of the functions of an Internet service provider, such as ISP 105. The computer system 201 interfaces to external systems through the modem or network interface 203. It will be appreciated that the modem or network interface 203 can be considered to be part of the computer system 201. This interface 203 can be an analog modem, ISDN modem, cable modem, token ring interface, satellite transmission interface (e.g. "Direct PC"), or other interfaces for coupling a computer system to other computer systems. The computer system 201 includes a processor 205, which can be a conventional microprocessor such as an Intel Pentium microprocessor or Motorola Power PC microprocessor. Memory 209 is coupled to the processor 205 by a bus 207. Memory 209 can be dynamic random access memory (DRAM) and can also include static RAM (SRAM). The bus 207 couples the processor 205 to the memory 209 and also to mass memory 215 and to display controller 211 and to the input/output (I/O) controller 217. The display controller 211 controls in the conventional manner a display on a display device 213 which can be a cathode ray tube (CRT) or liquid crystal display. The input/output devices 219 can include a keyboard, disk drives, printers, a scanner, and other input and output devices, including a mouse or other pointing device. The display controller 211 and the I/O controller 217 can be implemented with conventional well known technology. A digital image input device 221 can be a digital camera which is coupled to an I/O controller 217 in order to allow images from the digital camera to be input into the computer system 201. The mass memory 215 is often a magnetic hard disk, an optical disk, or another form of storage for large amounts of data. Some of this data is often written, by a direct memory access process, into memory 209 during execution of software in the computer system 201.

It will be appreciated that the computer system 201 is one example of many possible computer systems which have different architectures. For example, personal computers based on an Intel microprocessor often have multiple buses, one of which can be considered to be a peripheral bus. Network computers are another type of computer system that can be used with the present invention. Network computers do not usually include a hard disk or other mass storage, and the executable programs are loaded from a network connection into the memory 209 for execution by the processor 205. A Web TV system, which is known in the art, is also considered to be a computer system according to the present invention, but it may lack some of the features shown in FIG. 2, such as certain input or output devices. A typical computer system will usually include at least a processor, memory, and a bus coupling the memory to the processor.

It will also be appreciated that the computer system 201 is controlled by operating system software which includes a file management system, such as a disk operating system, which is part of the operating system software. One example of an operating system software with its associated file management system software is the operating system known as Windows '95 from Microsoft Corporation of Redmond, Wash., and its associated file management system, including Windows Explorer. The file management system is typically stored in the mass memory 215 and causes the processor 205 to execute the various steps required by the operating system to input and output data and to store data in memory, including storing files on the mass memory 215.

System Overview of the Invention

In this and following sections, the invention is described in terms of computer-executable instructions, such as program modules, being executed by a computer system, such as client computer 121 and server computer 111 in FIG. 1. Generally, program modules include routines, programs, objects, components, data structures, etc., that perform particular tasks or implement particular abstract data types. In a distributed computing environment, program modules can be located on both local and remote memory storage devices.

Figure 3:
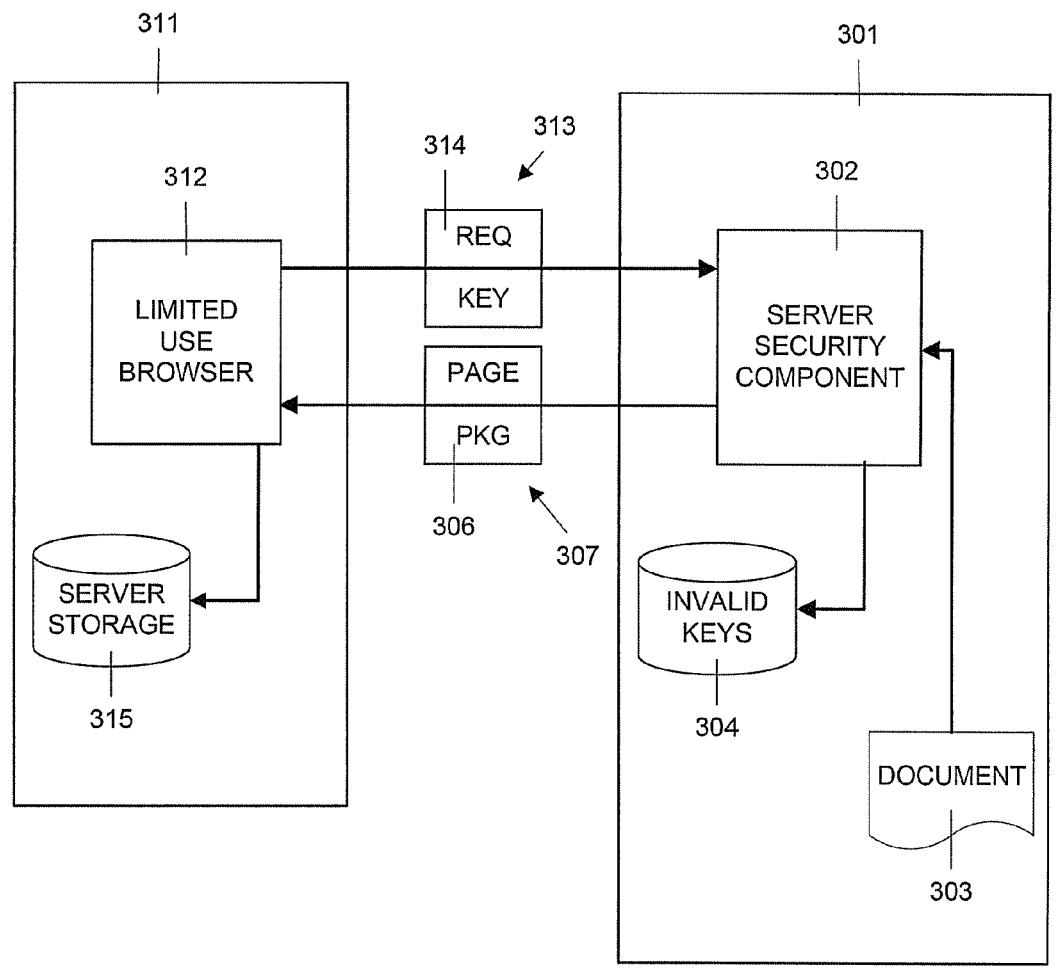
FIG. 3 is a diagram of a client computer and a server computer executing an embodiment of the present invention within that operating environment of FIG. 1.

One embodiment of the present invention is described in conjunction with an example illustrated in FIG. 3. In this embodiment, the invention is divided into three components that work together to enable web publishers to safeguard all or any portion of a web site.

The first component is the limited-use web browser (or add-in security module) executing on a client, such as the client computer system 121. The second component is a server security module executing on a server, such as the server computer system 111, that handles the distribution of web content over a LAN or a WAN. The third component comprises two security models for protecting the content: an "individual" security model that uses a secure document package, and a "common" security model that uses encryption. The security models have both client and server elements.

In one embodiment, the secure document package is a dynamically compiled executable that combines web content data with the ability to control and manipulate it. The server security component builds the secure document package and the limited-use browser/add-in security module runs it. In one embodiment of the common security model, the server security component creates and transmits a stream of encrypted content to the client computer, and the limited-use browser/add-in security module decrypts the content and displays it. The individual security model is most useful for distinct and self-contained static content, while the common security model is most useful for securing web pages and entire web sites without burdening the publisher with security details. Both security models can be used separately or in combination with each other and are described in detail in the next two sections.

Turning now to the example shown in FIG. 3, a server computer 301 for a content provider is executing the server component 302 of the security system. All interactions between the server component 302 and server computer 301 are through a secure communications channel.

In the present example, the content provider has used the individual security models to secure the pages on a web site. A user of the client computer 311 requests 313 a document 303 from the server 301 through the limited-use browser 312. The browser 312 sends a client key 314 to the server computer 301, either as a part of the request 313 or via socket communication as is well known in the art. When the user request 313 is received by the server computer 301, the server component 302 determines if a client key is associated with the request. If the key 314 is not present, the request is immediately rejected.

Assuming the client key 314 has been transmitted by the client computer 311, the server component 302 verifies the validity of the key 314. In the embodiment shown in FIG. 3, the key is checked 314 against a local invalid key store 304, which is a list of stolen or problem keys monitored by the server component 302. In a further embodiment not shown, the server component 302 also checks the key 314 against a global invalid key store maintained by a third-party, such as the vendor of the security system. In one embodiment, the key can merely specify to the server 301 that the browser is a limited-use browser; the key can specify this information and a serial number of the browser. If the key 314 is verified, the server component 302 performs the appropriate security functions depending on the security model used to protect the document 303 and transmits a web page 307 containing the secured document to the server computer 301 for downloading to the client computer 311. In the present example, the web page 307 contains a security document package 306 comprising the document 303 plus any 10 security restrictions the content provider has set. A format for one embodiment of the security document package is described in more detail in the fourth section.

Once the web page 307 is downloaded to the client computer 311, the secure document package 306 is cached on local storage 315. The limited-use browser 312 executes the secure document package 306 to access the document 303 but prevents the 15 user from saving, printing, dragging, or copying the document 303 to any other medium.

When a document is secured using the common security model, the server component 302 encrypts the document prior to downloading it, and the limited-use browser 312 decrypts the data for viewing only.

The system level overview of the operation of an exemplary embodiment of the invention has been described in this section of the detailed description. While the invention is not limited to any particular network configuration, for sake of clarity a simplified wide-area network with a single client and single server has been described. The invention is applicable to other configurations such as one server and multiple clients or several servers and several clients. The limited-use browser and related security system allows the publication of information on a network without fear of re-distribution. In addition, the invention enables the publisher to require compensation when a user uses the information, thus creating new ways of doing business on public networks such as the Internet.

For example, the invention eliminates the need for "thumbnail" size or low resolution previews of images or media for online sales, distribution or advertisement via the web. Instead, with the use of the invention, the entity selling visual content (images, movies. etc.) can display a preview of the full size high-resolution version of the content. When the user visits the web site through the limited-use browser/add-in security module, the user sees the exact content to be purchased since the security system protects the seller's valuable content from unauthorized re-distribution.

Similarly, the invention enables publishers of proprietary text (books. reports, scientific papers, etc.) to sell complete full text versions of their material online, without worrying about re-distribution. The selling entity can protect and then display, for online reading, the complete text of the material, and a user running the limited-use browser/add-in security module will be able to purchase and read a digital full-text copy of a book. Because the limited-use browser/add-in security module localizes the purchased content to a user's computer, the user will not be able to re-distribute the copy of the digital book outside his/her own computer system. Thus, online bookstores can literally be online bookstores through the use of the invention.

Additionally, the invention can enforce a requirement that a user must download content from the web site of origin. The limited-use browser/add-in security module ensures that one user cannot e-mail any portion of the content to another user(s), but rather can only e-mail the address (URL) of the originating web page. As a result, all users that want to download the content must go to the originating web site and be counted as measurable traffic for advertising purposes. For example, currently when a user sees a news story on a web site, the user can copy and paste the story into an e-mail client, and e-mail the story to another user. Unless the second user goes to the originating site, the user will not see the site's advertising and is not counted as site traffic. With the invention, the first user can send only the originating URL to the second user, thus requiring the second user to visit the originating web site and be counted if the second user wants the content.

Typically, compensation can be paid to the publisher when the content is downloaded by the end-user. Alternatively, if the end user acquires the limited user browser/module from the publisher, the publisher can also be compensated. The compensation can take the form of a one-time fee for the browser/module, a subscription fee for content and updates, a per-session fee that covers all content downloaded during a single connection session, or a per-access applied each time a piece of content is downloaded. The publisher can also choose to permit normally disabled user functions on the content upon payment of a special fee (thereby allowing these normally disabled functions to be used). Thus, for example, a transaction between a user/client system and a server system can enable certain, or all, of the normally disabled user functions upon some compensation from the user/client to the publisher. The compensation can be a form of payment, or can be the user's agreement to allow certain advertising to be provided to the user, or can be some information about the user that is provided by the user. The result of the transaction would allow the normally disabled user functions to be enabled for this publisher's content but not other publisher's content. Thus, the browser in this case has different functionality depending on whether the content is protected, and even if it is protected, whether the user has additional "privileges" because of a transaction between the user and the publisher and/or server.

Moreover, the limited-use browser/add-in security module and related security system of the present invention provides for compensation to the developer of the browser and security system. In one embodiment, the developer sells the server security component to the publisher. In an alternate embodiment, the developer also sells a number of copies of the limited-use browser/module to the publisher for downloading by end-users. The sales price for the server security component can be a one-time fee or based on usage. The sales price for the copies of the browser/module can be on a per copy basis when a copy is downloaded. Alternatively, the price of the security system and copies can be based on the advertising revenue obtained by the publisher as a result of site traffic for content protected by the invention. Additional compensation models will be readily apparent to one skilled in the art and are considered within the scope of the invention.

Methods of the Invention

In the previous section, a system level overview of the operations of an exemplary embodiment of the invention was described. In this section, the particular methods performed by the server and the clients of such an exemplary embodiment are described by reference to a series of flowcharts. The methods to be performed by the clients normally constitute computer programs made up of computer-executable instructions. Describing the methods by reference to a flowchart enables one skilled in the art to develop such programs including such instructions to carry out the methods on suitable computerized clients (the processor of the client computers executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the server computer executing the instructions from computer-readable media).

The server security component 302 acts in conjunction with the server computer 301 to create a server digital processing system performing the server methods described in detail later in this section in conjunction with FIGS. 4A-C. The server digital processing system handles user authentication, pre-processes requests for content, and performs the necessary security on the response data, depending on the security model chosen for the content. When a request is made for a secure file or page, server digital processing system first determines if the client computer is executing the limited-use browser or add-in security module and is making a valid request. If either condition is false, the server digital processing system denies the request or provides an alternate, non-secure file or page (where the content is not protected and hence can be reproduced). If the request is valid, the server digital processing system creates the secure content and instructs the server computer to serve it to the client computer.

On the client side, the limited-use browser/add-in security module 312 executing on the client computer 311 form a client data processing system performing the client methods described in detail later in this section in conjunction with FIGS. 5A-C. A client computer executing a general purpose browser without the add-in security module is typically prevented from accessing the secured portion of the web site. A limited-use browser, or a general-purpose browser equipped with the limited-use add-in security module, is able to view the secured content, but is not able to save, print, drag, or copy the content to any other medium.

The server and client digital processing systems rely on one or more of the following techniques to prevent the unauthorized copying of web content.

1. Window Subclassing. The client digital processing system intercepts and processes messages sent or posted before the destination window has a chance to process them. By subclassing a window, the client can monitor the behavior of the window, including key strokes input into the window. If the limited-use browser or add-in security module is not the foreground application, a message for an unauthorized function is discarded or the content is hidden from view.

2. Clipboard Flushing. This technique stops a user from sending a screen-capture to the clipboard by continuously destroying the contents of the clipboard while web browser is the active application. This technique also prevents background applications from copying the screen contents to the clipboard.

3. Disabling of Browser functions. The limited-use browser on the client computer typically is implemented with no menu items, keystrokes, or mouse actions that can copy, save, or print or otherwise produce a non-ephemeral reproduction. There can optionally be selective control or activation of these functions embedded in a secure document package as explained below. So, for example, if a web content owner authorizes a web page to be printed but not saved, the print function can be made available to the user, or if a particular user is allowed by a particular content owner to produce non-ephemeral reproductions (e.g. the user's limited-use browser has a particular serial/identification number that the content owner identifies as an authorized number for certain types of non-ephemeral reproductions), the corresponding functions can be activated.

4. Source Code Encryption. The HTML source code is encrypted by the server digital processing system using a system level encryption (SLE) key, and the client digital processing system does not allow viewing or saving unencrypted HTML source code.

5. User Level Encryption. A unique identifier called the ULE key is created when the limited-use browser or add-in security module is installed on the client computer. Downloaded content is localized to the client digital processing system by encrypting the content with the ULE key. The ULE key is created either directly or algorithmically from a machine ID for the client computer.

6. Secure Document Package. A secure document package is composed of a document manager and one or more web pages, each of which is encrypted with the ULE. To decrypt the package, it is necessary to know where to break up the individual pages before attempting the decrypt the file and even then encryption makes the content unusable to anyone but the owner of the machine with the client registered with the unique ULE key.

7. Disabling "Drag & Drop". The ability to "drag & drop" an image or object within a web page is not available in the limited-use browser or a browser equipped with the add-in security module.

8. Secure Cache Content. All web content downloaded and stored on the client computer in the course of browsing the web, known as cached content, is secured from the user through encryption.

9. Device Context Monitoring. Device Context Monitoring checks the context for each input/output device against the secured image or text to determine if protected content is being accessed by the device.

Server Methods

Figure 4A:
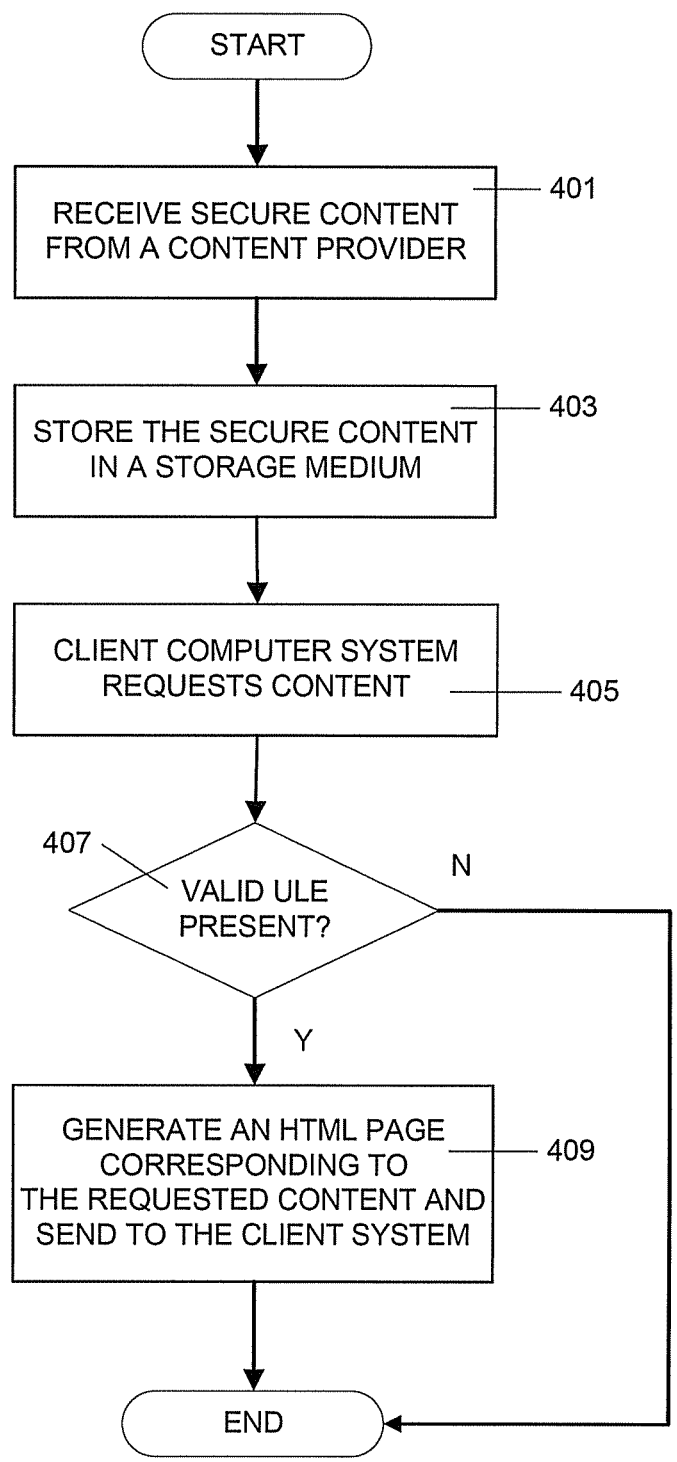
FIGS. 4A, B and C are two charts of a method performed by the server computer of FIG. 3.
Figure 4B:
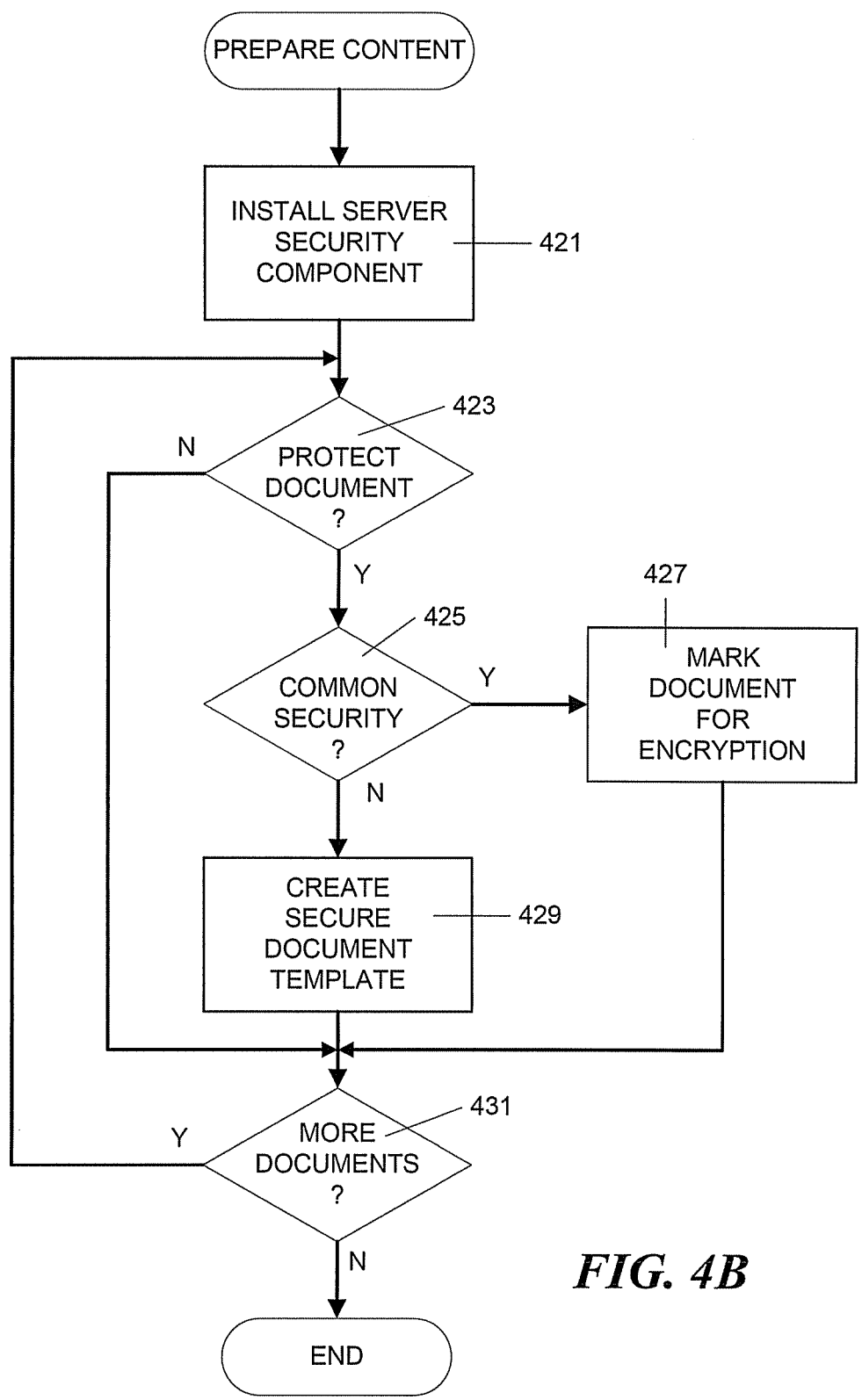
Figure 4C:
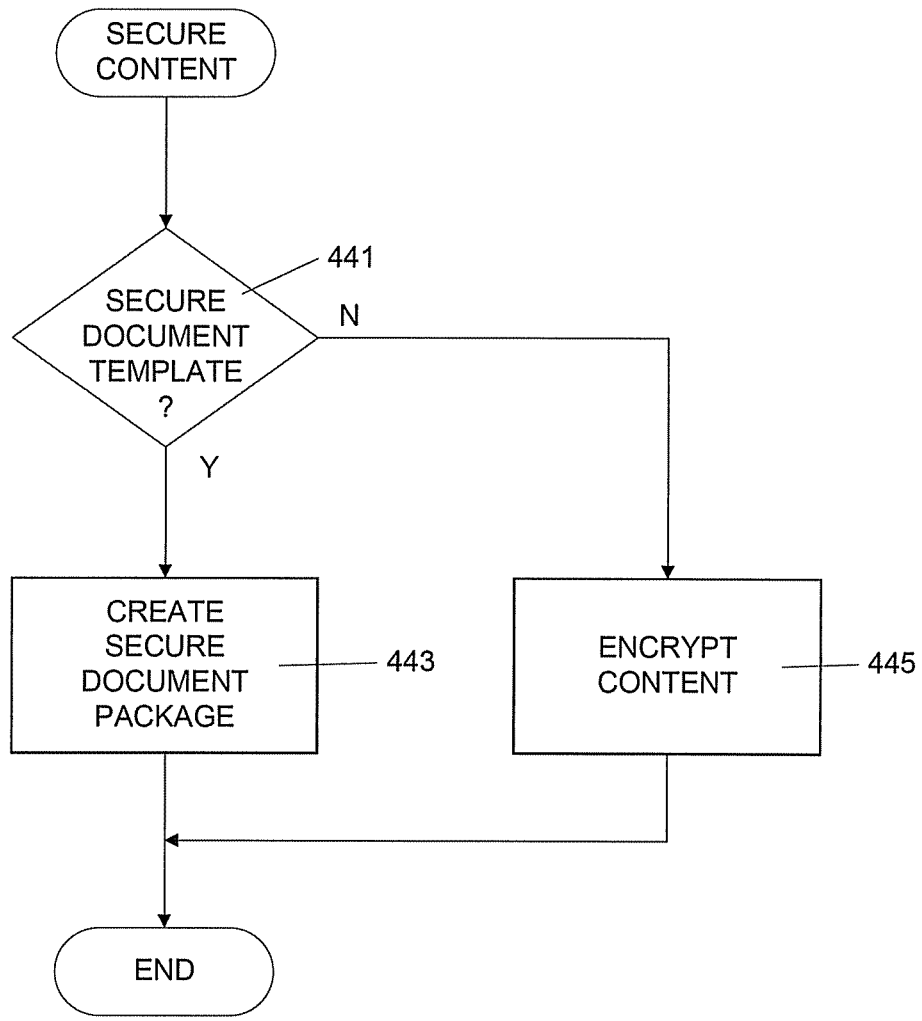

FIGS. 4A-C are flowcharts of one embodiment of the method executed by a server digital processing system. In FIG. 4A, the server system receives secured content from a content provider (block 401) and stores the content in a storage medium (step 403). At some later point in time, a client computer requests the secured content from the server system (block 405). The server system determines if the client computer is running the limited-use browser/add-in module by verifying the client ULE (block 407) and denies access if it is not (block 411). If the client computer is running the limited-use browser/module, the server system generates a secure HTML page corresponding to the requested content and sends the page to the client system (block 409). In an alternate embodiment not shown, the server transmits a substitute web page (e.g. a non-protected version of the content which presumably has less content than the protected version).

FIG. 4B is a flowchart of one embodiment of the process represented by block 401. In this embodiment, the content provider installs the server security component on the server computer (block 421). The content provider determines what documents are to be protected (block 423). Each document to be protected under the common security model (block 425) is marked for later encryption with the system level encryption key (SLE) (block 427). If the document is to be protected under the individual security model, the server security component builds a secure document template associated with the document (block 429). In one embodiment, the same computer is used to create the secure content and to serve it to the client. In an alternate embodiment, the computer used to serve the content is separate from the computer used to create the secure content, although both are owned by the content provider. In still another embodiment, the computer that serves the content is not owned by the content provider.

FIG. 4C illustrates one embodiment of the process represented by block 409. The server system handles the client request and responds differently depending on the security model the publisher has chosen for any particular content. If the client request is for a secure document template (block 441), the content provider has chosen the individual security model for this particular content. In this case, the server system processes the request by dynamically assembling all of the components such as text, images and files, described by the template, along with the secure document manager into a self-contained secure document package and encrypts each component with the client ULE (block 443).

In one embodiment, the secure document package is in the form of an object, such as provided by one of the common object models, COM or CORBA. The secure document object (SDO) is comprised of the encrypted content, along with information about the content, including user access properties and optional restrictions based on date, access and network connection. The document manager is a shared library, that is loaded into memory by the client and accessed through the SDO's exposed interface. Having the data embedded separately in the object allows the object to manage itself, conditionally allow access, and to destroy itself if the object has expired (if an expiration date is one of the exposed properties). The result of the processing at block 443 is a file that contains encrypted content plus all the functionality of a component architecture, including methods to access exposed methods, properties and events.

If the client request is for a web page, file or other content, then the server system handles security for the response just before the content is returned to the client. At this point, with the content accessed but before sending it back to the client, the server system encrypts the content with the SLE (block 445).

Client Methods

Figure 5A:
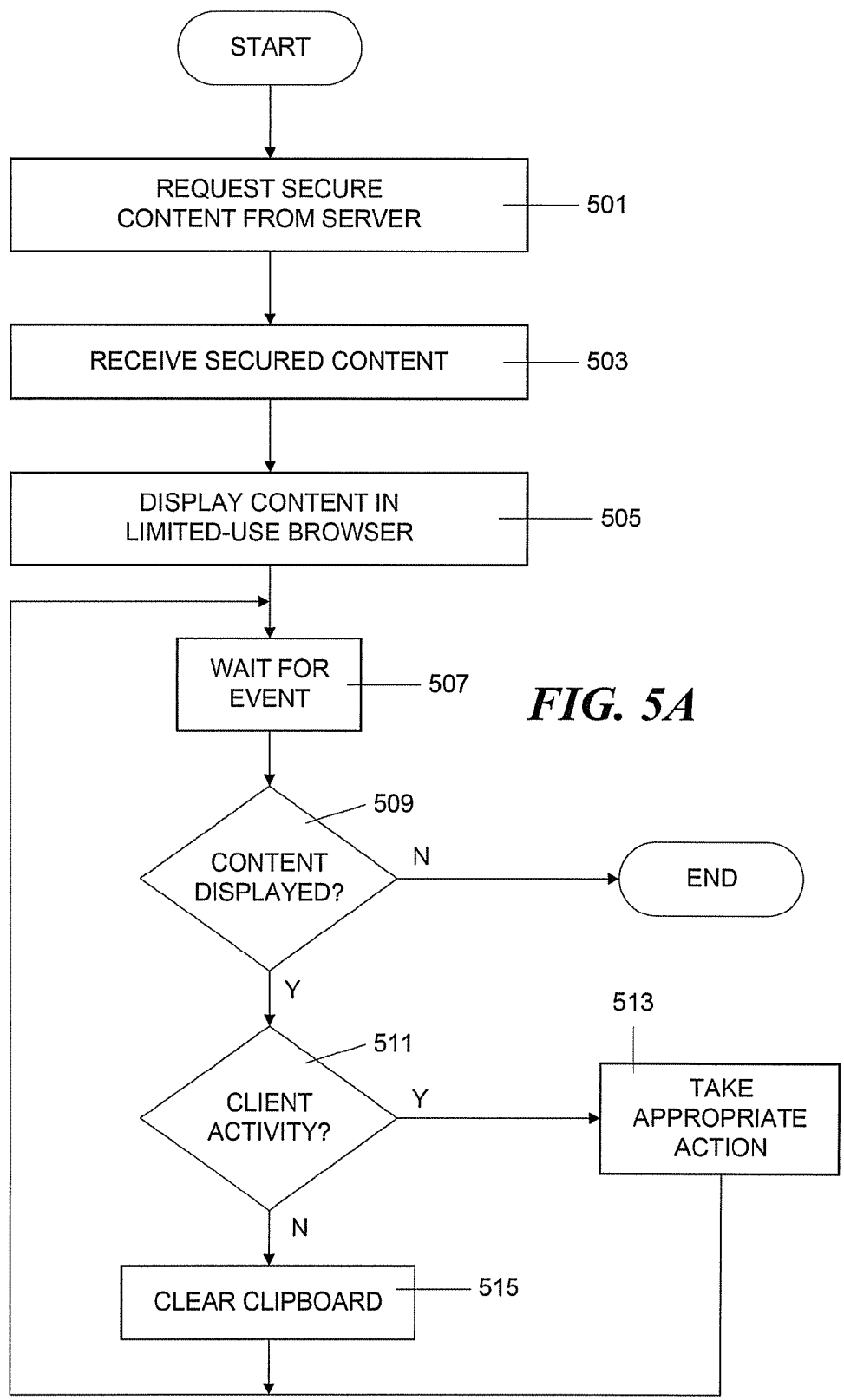
FIGS. 5A, B and C are two charts of a method performed by the client computer of FIG. 3.
Figure 5B:
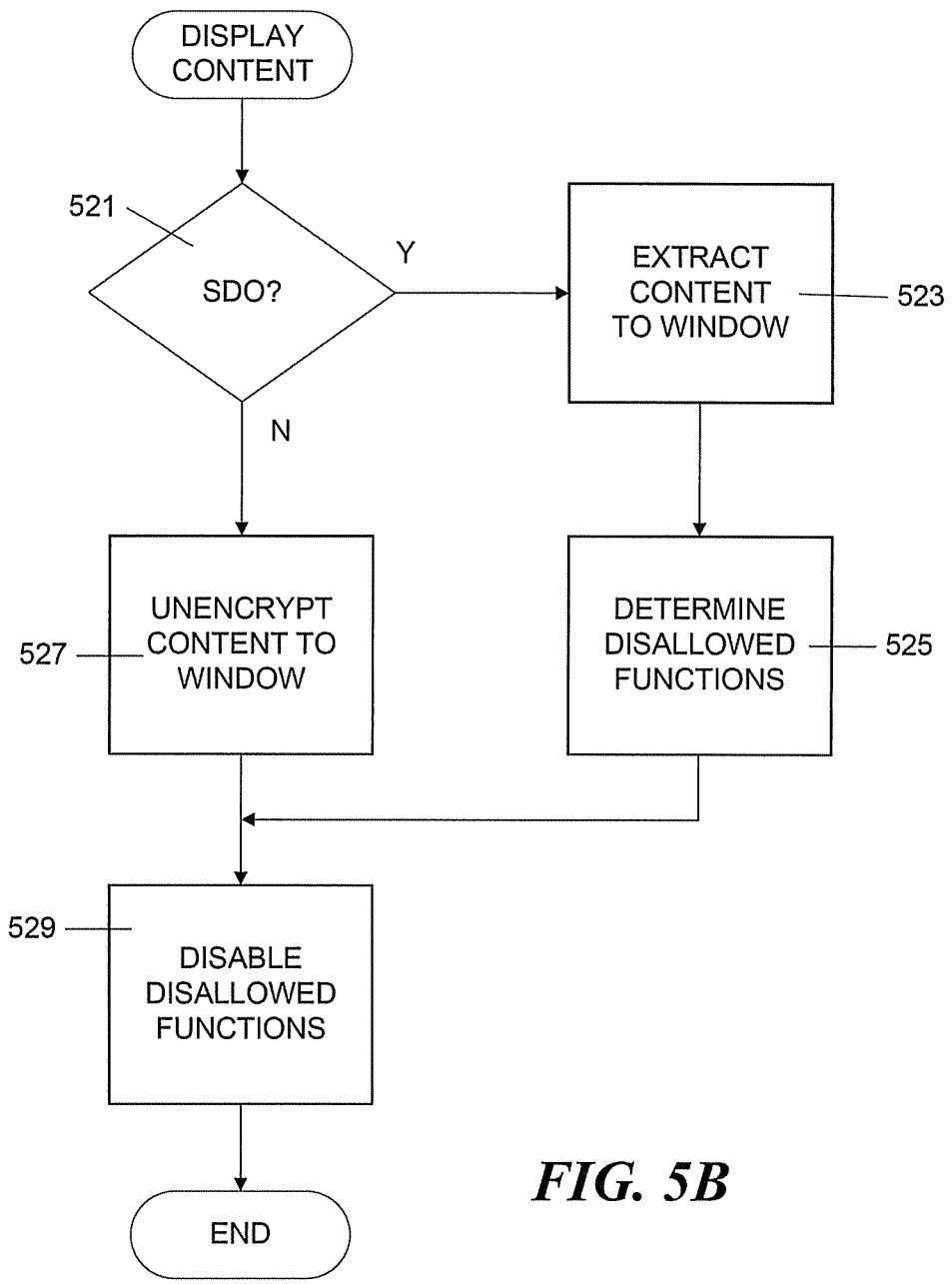
Figure 5C:
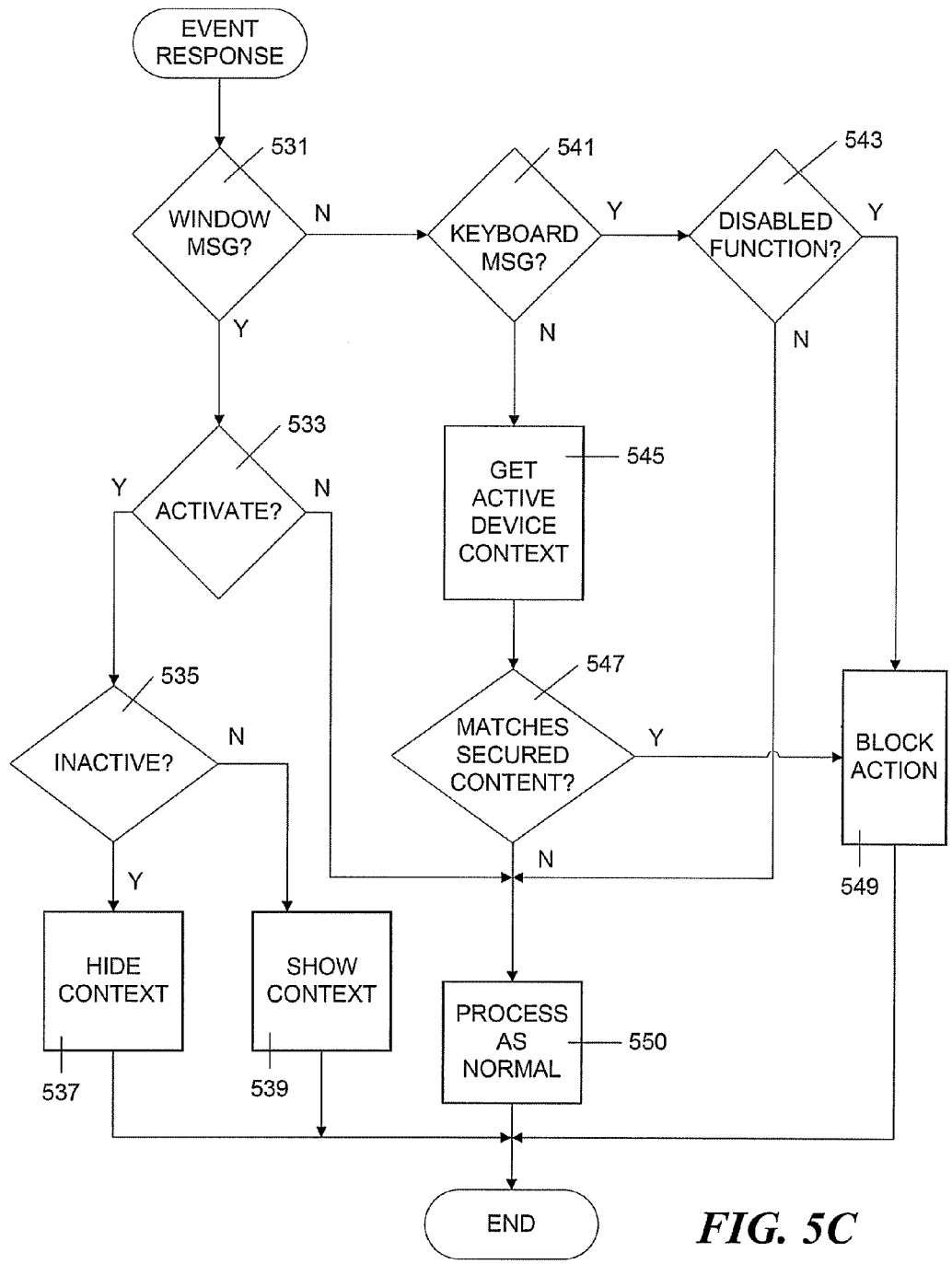

FIGS. 5A-C are flowcharts of the method executed by the client digital processing system. The client system requests protected content from a server system via a network connection, such as through an ISP when the server system is on the Internet (block 501). The client system receives the requested content from the server system as either encrypted HTML content or secured document package, depending on the security imposed by the content provider (block 503) and displays it within a window of the limited-use browser (or through the add-in security module, which is also referred to as a browser window) (block 505). The client system monitors activity on the client computer while the content is in the browser window (blocks 507 and 509) and responds appropriately (block 513) as described in detail below. The client system also periodically clears the clipboard while the content is present (block 515). When the user requests and receives unprotected content, the limited-use browser/module performs as a regular full-use browser (e.g. capable of the normal non-ephemeral reproduction functions such as copying/pasting, saving to disk, printing, etc.)

As part of the request for content at block 501, the client system also transmits its ULE key to the server system. The server system uses the client ULE key to encrypt the content as previously described. All protected content downloaded and stored on the client system (cached content) is also secured using the ULE key so it cannot be transferred to another computer (represented by block 503). FIG. 5B illustrates one embodiment of the process represented at block 505. The client system determines whether the content is embedded in an SDO or encrypted with the ULE (block 521). Embedded content is extracted from the SDO (block 523) while encrypted content is decrypted (block 527). While the protected content is being displayed, printing, source code viewing and file saving functionality in the limited-use browser are disabled by modifying "user-interface objects" associated with standard menu items, pop-up menu items, toolbar buttons, and accelerator keys that are capable of generating commands that modify content (block 529). Each user-interface object has an identifier (ID) and through ID mapping, the client system can attach code or change the functionality of the object or calls to the object. By this means, the client system disables calls to specified toolbar buttons that call printing functionality, or display the file's source to the user, or allow saving of the file. This includes disabling and graying out the following menu items in the limited-use browser: Print . . . , Page Setup, Save, Save As . . . , View Source, Save Picture As . . . , Set as Wallpaper and Copy. The SDO can also contain change the default disablement of certain functions (block 525).

The method executed by client digital processing system employs subclassing and device context monitoring to monitor the activity on the underlying computer at block 513 and illustrated in detail in the flowchart of FIG. 5C.

As well known in the art, subclassing is a technique that allows an application to intercept messages destined for another window. When an application subclasses a window, it can perform three actions with the message: (1) pass the message to the original window procedure; (2) modify the message and pass it to the original window procedure; (3) not pass the message. The application subclassing a window can decide when to react to the messages it receives. The application can process the message before, after, or both before and after passing the message to the original window procedure. Subclassing methods are used to hide the secure view by intercepting and handling activate messages for the window, and to interrupt screen copying by intercepting and handling keyboard messages from the user.

A windows message handler monitors window activation and deactivation (block 531). The method performed by the windows message handler is described with reference to messages for the Microsoft Windows operating system but the corresponding messages in other windowing operating systems will be immediately apparent to one skilled in the art. The windows message handler intercepts a WM_ACTIVATE message for the window containing the content (block 533). If the parameter of the activate message is WA_INACTIVE (block 535), then the window has lost focus and the view content is hidden (block 537). The view can be hidden by painting the view background a solid color, clearing the contents of the view, or covering the view with a blank form view called a "view cover." If the WM_ACTIVATE message parameter is not WA_INACTIVE (ex.: WA_ACTIVE or WA_CLICKACTIVE), then the window has focus and the view content is displayed by refreshing the view or hiding the view cover (block 539).

The keyboard message handler (block 541) monitors keystrokes and filters out single keys or combinations of keystrokes that have not be redefined by remapping IDs as described previously but are to be disabled (block 543). Such disallowed actions are blocked (block 549). In one embodiment of block 549, the keystrokes are ignored. In an alternate embodiment, an error message is also displayed.

All graphical and text output on the client computer is passed through a device such as a monitor or printer, or manipulated with a pointing device such as a mouse. Each active device is allocated a device context that manages the current data being processed. By monitoring all allocated device contexts (block 545), the client digital processing system can determine if the context of a device matches a secured image or text (block 547) and block disallowed actions (block 549). For example, if the disallowed action is printing or dragging-and-dropping, the action can be blocked by overwriting the device content. In one embodiment, the client analyzes the size, compares the pixel values, and/or performs pattern matching to determine if the secured image or text is being accessed by the device.

Figure 6A:
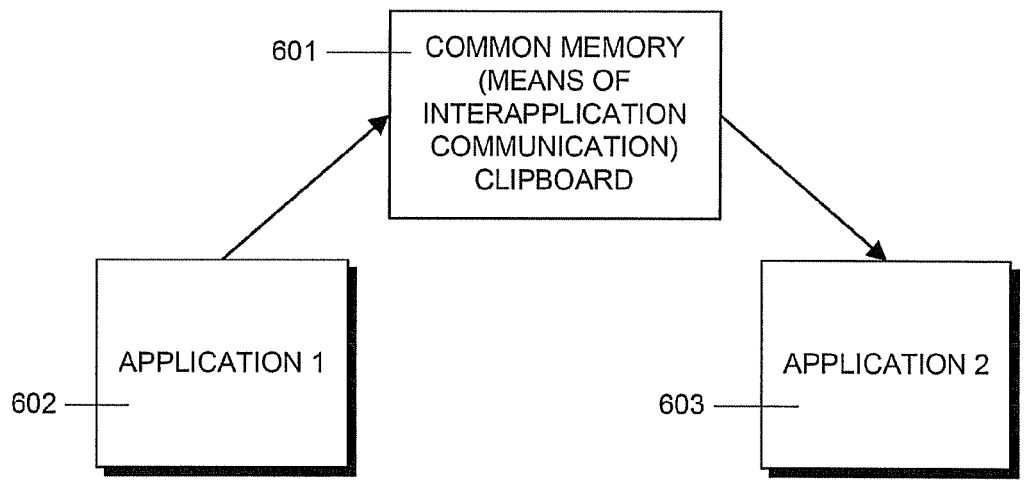
FIGS. 6A and B illustrate clipboard use by the client computer of FIG. 3.
Figure 6B:
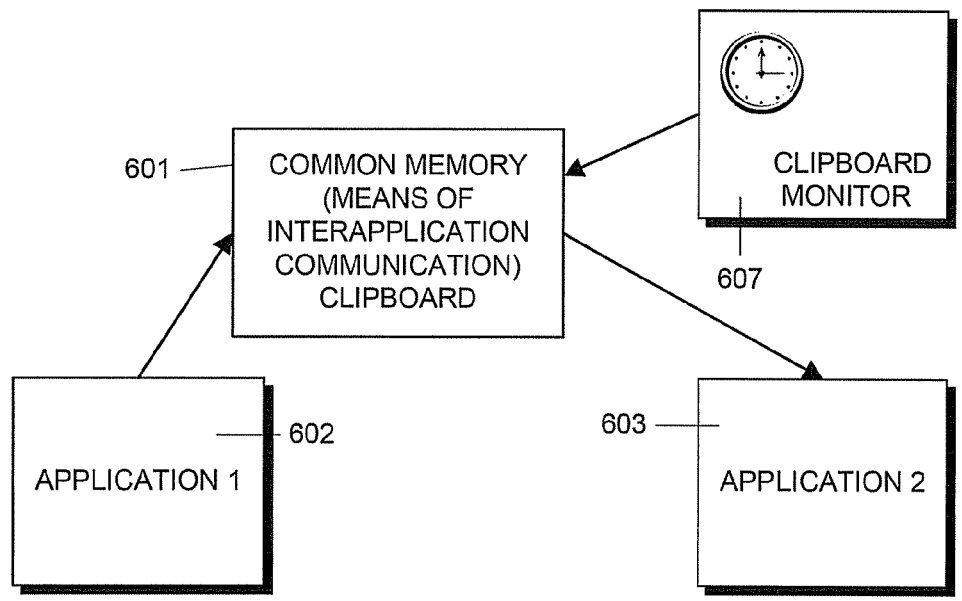

Turning now to FIG. 6A-B, the clipboard monitor process of block 515 is described. As shown in FIG. 6A, the most common means of inter-application communication is the clipboard. The process can be initiated by a user or an application. When a user requests a copy or print-screen operation to place data in the clipboard 601, the application 603 makes API calls to empty the clipboard 601 and then to send data to the clipboard 601. When the user makes a paste request, the receiving application 605 enumerates the formats of the data in the clipboard and, having found one which is applicable, transfers the data.

The clipboard monitor watches the clipboard contents for any change. As shown in FIG. 6B, one embodiment of the disclosed clipboard monitor 607 frequently monitors the contents of the clipboard 601 and deletes any contents if they are present. This prevents background processes from using the clipboard to copy view-only content while the limited-use browser has the focus and is displaying protected content as the foreground application. Monitor frequency increases with consecutive clipboard usage detection.

The particular methods performed by client and server data processing systems of an exemplary embodiment of the invention have been described. The methods performed by the server have been shown by reference to flowcharts in FIGS. 4A-C including all the acts from 401 until 445. The methods performed by the client have been shown by reference to flowcharts in FIGS. 5A-C including all the acts from 501 until 550. An additional client method has been described with reference to functional diagrams in FIGS. 6A-B.

An Implementation of the Invention

In this section of the detailed description, a particular implementation of the invention is described including authentication and event handling, and a data structure for the secure document package.

Server Authentication and Event Handling

The server security component filters web client authentication, and web server request and response events. The server determines if a request from a particular client is applicable and the client digital processing system is running the limited-use browser/module. The server security component intercepts specific web server events and imposes a secure framework on the processing of web content. The server security component provides enhanced logging capabilities, custom authentication, and response encryption through web notification filters. One embodiment of the server security component authenticates clients and processes requests for content by being linked directly to an Internet server through an ISAPI/NSAPI (Internet Server Application Programming Interface/Netscape Server Application Programming Interface) filter or as an integrated part of an Internet web server. The filters are described in terms of HTTP commands that are well-known in the art.

When CHttpFilter::HttpFilterProc is called, the notifications received will determine which of the CHttpFilter member functions will be called. The invention overrides five HttpFilterProc member functions to add functionality to the web server. For example, sever security component adds encryption by overriding the OnSendRawData member function and processing the data that is being sent back to the client. The following is a list of other functions the invention filter overrides to provide a secure framework for web content:

OnAuthentication authenticates the client. The server can authenticate users independent of Internet/web server or operating system security. Authentication allows the publisher to set selective access to secure content.

OnSendRawData notifies the filter before raw data is sent from the server to the client. If the publisher has tagged a page using the common security model, then the raw data being sent back to the requesting client will be encrypted before responding.

OnLog logs information to a server file.

Common Security Model

One implementation of the disclosed common security model transmits a stream of encrypted text from a web server, either through an ISAPI/NSAPI filter or other integrated server module. The common security model is typically used to secure individual text or image elements, either individual web pages or entire web sites, by encrypting the response content from an Internet/web server. The server security component validates client request as previously described, and, upon validation, intercepts the Internet/web server's response and encrypts the outgoing data. The common security model uses a single encryption key for all content, as compared to the individual security model which uses a key unique to each client and prevents other users from accessing the secured content, as described next. The common security model allows the publisher to tag specific files/pages for secure or non-secure responses. This gives the publisher the ability to selectively secure any content.

Individual Security Model

Figure 7:
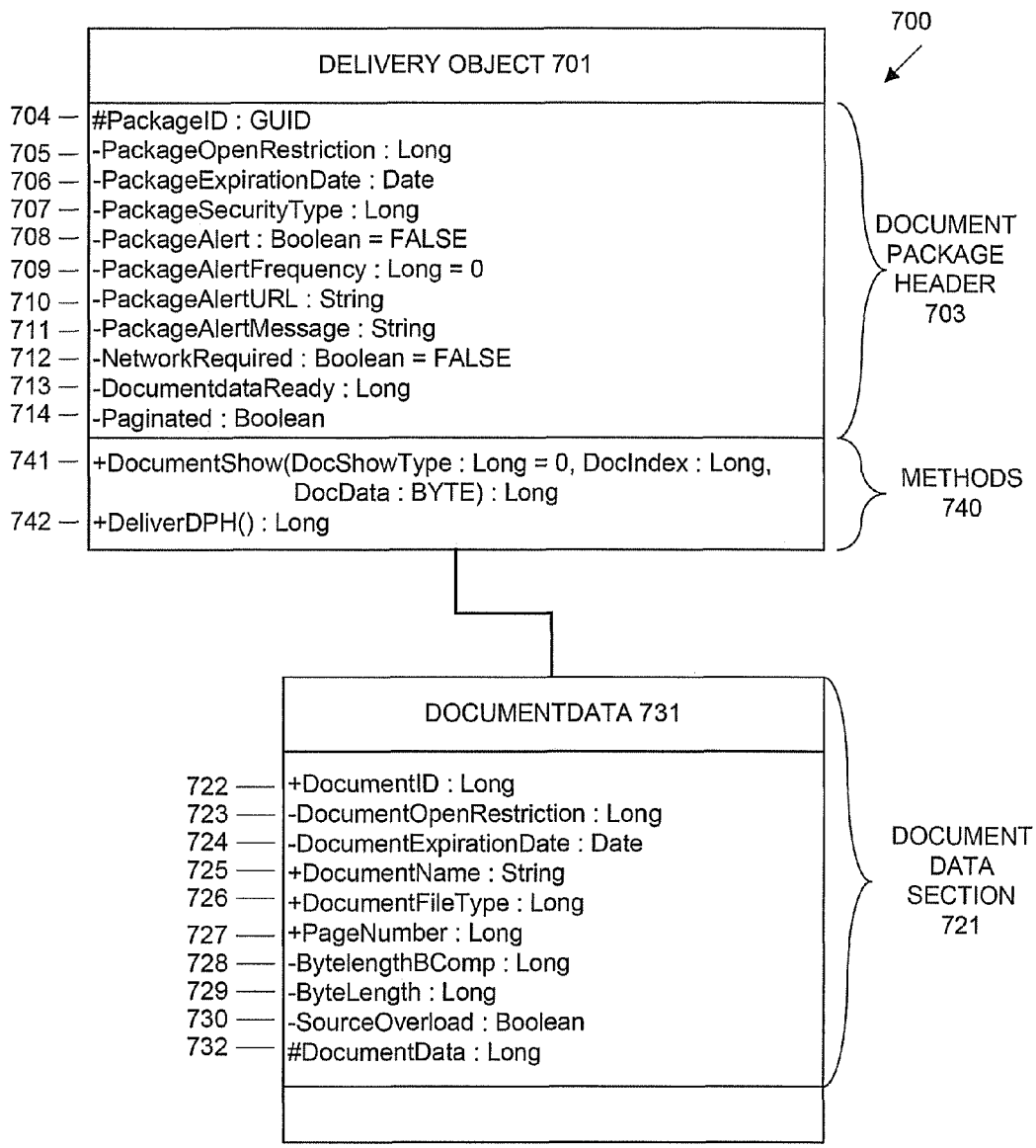
FIG. 7 is a data structure diagram of one implementation of a secure document package exchanged between the client and server computer of FIG. 3.

As previously described, the individual security model uses a secure document package or object that contains the web page, files or other content requested by the client, along with a document manager. A data structure for one embodiment of an SDO 700 is illustrated in FIG. 7.

When a limited-use browser/module displays the secured content embedded in the SDO, it invokes one or more of the object's methods described in detail later in this section. As described above, the SDO is preferably a set of text, files, images or pages that a content provider has grouped together and encapsulated in one object using the server component. The SDO is divided into three sections: a delivery object 701 which is the DLL binary for the document manager, a document package header 703 that describes the content data, size, restrictions, etc, and the document data 721 containing the content for one or more individual files, pages, pieces of text, image or any singular part of the secured content (DocumentData 731). The document package header 703 maintains a file index entry 720 for each instance of DocumentData 731 in the document data section 721. In the present implementation, the SDO is downloaded to the client computer as a compressed file. When opened or loaded by the limited-use browser/module, the file is decompressed into a DLL file and loaded dynamically.

The limited-use browser/module queries the SDO through a DeliverDPH (Deliver Document Package Header) method as described further below, which returns the package content information properties shown in FIG. 7.

PackageID 704 is a globally unique identifier (GUID) for the secure document package that can be logged by the content provider and, optionally, at a central location such as the vendor of the security system. PackageOpenRestriction 705 defining the number of times package can be opened before the document manager disables the package. A PackageExpirationDate 706 for the entire package. In the present implementation, the expiration date is read-only and is initialized before the SDO is assembled on the server. PackageSecurityType 707 that defines whether the DocumentData 731 is encrypted or not.

The content provider can require it be alerted when the SDO is accessed. A PackageAlert flag 708 is set to TRUE if publisher wants to receive an alert. PackageAlertFrequency 709 defines how often the SDO will alert the publisher if the PackageAlert flag 708 is TRUE. PackageAlertURL 710 containing a destination uniform resource locator (URL) for the alert and PackageAlertMessage 711 contains the alert text. When these properties are set, the SDO checks for an open network connection on the user's workstation and send a message to the specified URL. This allows the server component to track downloaded objects.

If NetworkRequired 712 is set to TRUE, the limited-use browser/module is required to be connected to the Internet anytime this SDO is accessed. If no connection is found, the limited-use browser will not display the content. Once online and connected to the originating server, the SDO tells the server who is viewing the content and in this way the content owner has a way of tracking usage.

A DocumentDataReady flag 713 is set by document manager when the DocumentData 731 can be accessed, i.e., decompressed and/or decrypted. A Paginated 5 flag 714 set to TRUE indicates that the contents of document data section 721 are accessible by page numbers.

Each instance of DocumentData 731 is described through a series of properties, which are returned as a result of the DeliverDPH method. DocumentID 722 contains a unique identifier for the associated DocumentData 731. DocumentOpenRestriction 723 defines the number of times this content can be accessed. DocumentExpirationDate 724 contains a date after which this particular piece of content can no longer be accessed. DocumentName 725 is the text name for the associated DocumentData 731. DocumentFileType 726 contains the type of the associated DocumentData 731. PageNumber 727 is the page number of the DocumentData 731 (if the document data section 721 is paginated). ByteLengthBComp 728 contains the byte length of the associated DocumentData 731 before compression, while ByteLength 729 contains the actual length of the content. A SourceOverload flag 730 permits the limited-use browser/module to seek newer content on the original server. This is especially useful for updating images without having to build a new secure document template on the server. DocumentData 732 contains the actual protected content.

The present implementation of an SDO provides support for two methods of controlling access to the encapsulated content. A DocumentShow method 741 is used by the limited-use browser/module to access the embedded data. A particular instance of DocumentData 731 is accessed by PageNumber 727, DocumentID 722, or on a first-in, first-out basis within the document data section 721 depending on the values of a DocShowType argument and a Doc Index argument for the method. The DeliverDPH (Deliver Document Package Header) method 742 returns the package content information to the requesting client as described immediately above. Both methods return a success/error code upon execution.

CONCLUSION

A limited-use browser and related security system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that only one of the two disclosed security models can be used by the content provider, or that security models providing the same functionality can be substituted without exceeding the scope of the invention. Furthermore, those of ordinary skill within the art will appreciate although portions of the invention have been described in terms of its implementation in a component architecture, such an architecture is not required to practice the invention.

The terminology used in this application is meant to include all client-server operating environments. While the invention is described in terms of preferred embodiments in a specific system environment, those of ordinary skill in the art will recognize that the invention can be practiced, with modification, in other and different hardware and software environments. Therefore, it is manifestly intended that this invention be limited only by the following claims and equivalents thereof.

What is claimed is:

1. A method, comprising:
    initiating, by a device, a presentation of content via a browser application;
    identifying protected content included in the content; and
    prohibiting at least one non-ephemeral reproduction operation associated with the protected content, wherein the prohibiting the at least one non-ephemeral reproduction operation comprises:
        determining that the browser application is operating as a background application on the device; and
        in response to the determining, hiding the protected content from the at least one non-ephemeral reproduction operation by covering the protected content on a display of the device.

2. The method of claim 1, wherein the prohibiting the at least one non-ephemeral reproduction operation further includes continually clearing a memory location of the device employable to copy the protected content.

3. The method of claim 1, wherein the covering comprises covering the protected content with a view cover on the display of the device.

4. The method of claim 1, wherein the prohibiting the at least one non-ephemeral reproduction operation further includes encrypting a source code included with the protected content and prohibiting displaying, saving, or copying an unencrypted version of the source code on the client device.

5. The method of claim 1, further comprising initiating another presentation of a request for compensation for enabling the at least one non-ephemeral reproduction operation associated with the protected content.

6. The method of claim 5, further comprising confirming that the request for compensation is satisfied prior to the enabling of the at least one non-ephemeral reproduction operation associated with the protected content.

7. The method of claim 1, wherein the hiding the protected content from the at least one non-ephemeral reproduction operation further comprises clearing at least a portion of the protected content from a display of the client device.

8. An apparatus, comprising:
    a memory, communicatively coupled to a processor, the memory having stored therein executable instructions, comprising:
        a limited use browser configured to at least:
            identify protected content included in content for presentation by a web browser, and
            prevent at least one non-ephemeral content operation associated with the protected content on the apparatus based on a determination whether the web browser is in operation in a background of the apparatus, and
            in response to the web browser application being determined to be in operation in the background of the apparatus, obscure the protected content from the at least one non-ephemeral reproduction operation by instructing the web browser to display an overlay over at least a portion of the protected content on a display of the apparatus.

9. The apparatus of claim 8, wherein the limited use browser is configured to prevent the at least one non-ephemeral content reproduction operation associated with the protected content on the apparatus by continual deletion of a memory location of the apparatus employable to copy the protected content.

10. The apparatus of claim 8, wherein the limited use browser is further configured disable a drag and drop function of the apparatus to prevent the at least one non-ephemeral content reproduction operation associated with the protected content on the apparatus.

11. The apparatus of claim 8, wherein the limited use browser is further configured to encrypt a source code included with the protected content and to prohibit a display, a save, or a copy of an unencrypted version of the source code on the apparatus to prevent the at least one non-ephemeral content operation associated with the protected content on the apparatus.

12. The apparatus of claim 8, wherein the limited use browser is further configured to present a request for compensation to allow the at least one non-ephemeral content reproduction operation in response to a payment.

13. The apparatus of claim 12, wherein the limited use browser is further configured to verify the payment in response to the request, and allow the at least one non-ephemeral content reproduction operation in response to the payment being determined to have been received.

14. A non-transitory computer-readable storage comprising executable instructions that, in response to execution, cause a device comprising a processor to perform operations, comprising:
    displaying content via a browser application;
    identifying protected content included in the content; and
    preventing at least one non-ephemeral reproduction operation associated with the protected content; and
    in response to determining that the browser application is a background application on the device, concealing the protected content from the at least one non-ephemeral reproduction operation, wherein the concealing comprises covering the protected content on a display of the device.

15. The non-transitory computer-readable storage of claim 14, wherein the preventing the at least one non-ephemeral reproduction operation further comprises recurrently clearing a memory location of the device used for copying the protected content.

16. The non-transitory computer-readable storage of claim 14, wherein the covering comprises covering the protected content with a view cover on the display of the device.

17. The non-transitory computer-readable storage of claim 14, wherein the preventing the at least one non-ephemeral reproduction operation comprises encrypting a source code included with the protected content and prohibiting displaying, saving, or copying an unencrypted version of the source code on the device.

18. The non-transitory computer-readable storage of claim 14, wherein the concealing the protected content from the at least one non-ephemeral reproduction operation further comprises clearing at least a portion of the protected content from a display of the device.

19. The non-transitory computer-readable storage of claim 14, the operations further comprising presenting a request for compensation for access or use of the protected content via the browser application.

20. The non-transitory computer-readable storage of claim 19, the operations further comprising receiving a payment in response to the request.

21. The non-transitory computer-readable storage of claim 20, the operations further comprising allowing the at least one non-ephemeral reproduction operation associated with the protected content in response to the payment being determined to have been received.

22. A device, comprising:
   means for presenting content by an application;
   means for identifying protected content included in the content; and
   means for prohibiting at least one non-ephemeral reproduction operation on the device with respect to the protected content; and
   means for masking the protected content from the at least one non-ephemeral reproduction operation by covering the protected content on a display of the device in response to determining that the application is a background application on the device.

23. The device of claim 22, wherein the means for prohibiting the at least one non-ephemeral reproduction operation comprises means for recurrently clearing a memory location of the device employable for copying the protected content.

24. The device of claim 22, wherein the covering comprises covering the protected content with an overlay on the display of the device.

25. The device of claim 22, wherein the means for prohibiting the at least one non-ephemeral reproduction operation comprises means for encrypting a source code included with the protected content and means for prohibiting displaying, saving, or copying an unencrypted version of the source code on the device.

26. The device of claim 22, wherein the means for masking the protected content from the at least one non-ephemeral reproduction operation comprises means for clearing at least a portion of the protected content from a display of the device.

27. The device of claim 22, further comprising means for presenting a request for compensation for access or use of the protected content via the application.

28. The device of claim 27, further comprising means for receiving a payment in response to the request.

29. The device of claim 28, further comprising means for allowing the at least one non-ephemeral reproduction operation associated with the protected content in response to the receiving of the payment.

* * * * *